(No Model.)

J. TILTON.
FAUCET FOR SHIPPING AND SERVICE CANS.

No. 336,174. Patented Feb. 16, 1886.

Witnesses:

Inventor

By his Atty.,

UNITED STATES PATENT OFFICE.

JOHN TILTON, OF SAN FRANCISCO, CALIFORNIA.

FAUCET FOR SHIPPING AND SERVICE CANS.

SPECIFICATION forming part of Letters Patent No. 336,174, dated February 16, 1886.

Application filed January 29, 1885. Serial No. 154,253. (No model.)

*To all whom it may concern:*

Be it known that I, JOHN TILTON, a citizen of the United States, residing in the city and county of San Francisco, State of California, have invented certain new and useful Improvements in Faucets for Shipping and Service Cans and Packages; and I do hereby declare that the following is a full, clear, and exact description of my said invention, reference being had to the accompanying drawings, that form part of this specification.

My invention has for its object to produce a faucet for barrels, cans, and other vessels used for holding and transporting oil and many liquids, and as a permanent attachment to the same for the purpose of enabling the contents to be drawn off from the original package in quantities as required from time to time; but while my invention relates more particularly to faucets and attachments of the kind for coal-oil cans and packages, and for metal barrels, tanks, and other vessels and receptacles from which it is desired to draw off portions of the contents, it will be found that the faucet may be applied and used in many other situations.

My invention consists in the construction and combination of parts, as hereinafter described and set out, producing a faucet of extreme simplicity and of cheap construction.

Figure 1:
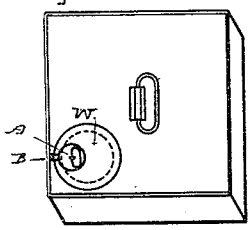
Figure 2:
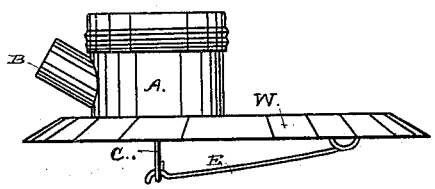
Figure 3:
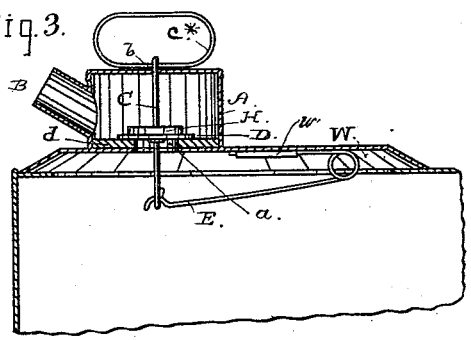
Figure 4:
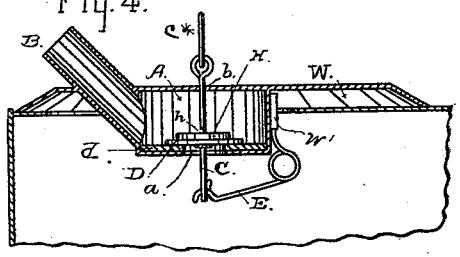
Figure 5:
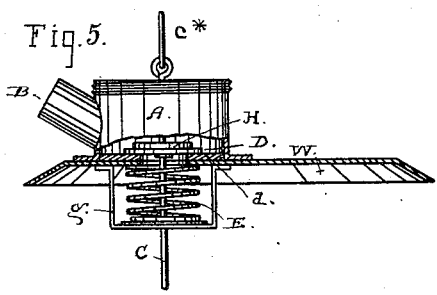
Figure 6:
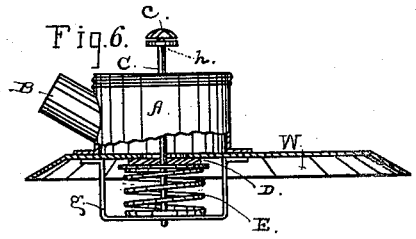

In the accompanying drawings, herein referred to by figures and letters, Figure 1 is a perspective view of a can with my faucet applied. Fig. 2 is a side elevation of the faucet detached. Fig. 3 is a vertical section of faucet and upper portion of can. Fig. 4 is a similar view of a modified form. Figs. 5 and 6 show further modifications.

The body of the faucet is provided with or is fixed to a flange, W, for conveniently fixing the device to the can or receptacle, or to the surface around an opening. This flange may be placed either at the front of the faucet-body, as in Fig. 4 of the drawings, or behind it, as in Figs. 1, 2, 5, and 6. In the first position the faucet will, when applied, be outside of the can, and in the other it will be inside with nothing but the spout and the handle in sight.

The faucet-body is a short cylinder, A, with an aperture in each end and an opening at one side, from which leads a spout or nose, B. Aperture $a$ is the inlet, and is somewhat larger than aperture $b$ in the opposite end or the head, which aperture is only large enough for the valve rod or wire C to pass through. On this valve-rod is fixed a disk, D, that forms a valve to close the aperture $a$. To insure a close joint, a seat, $d$, of some elastic or yielding material—such as cork, or leather, or rubber when the same can be used to advantage—is placed and secured around the aperture $a$ for the valve-disk to bear against. Behind this valve a spring, E, is applied in such manner as to hold the disk D against the opening $d$. The rod C extends through the cylinder A and projects at both ends. The end at the front is provided with a head or knob, $c$, or a finger-ring, $c^*$, for convenience in working the valve. The character of movement required to work the faucet, whether by pushing in or by pulling out the rod, is determined by the mode in which the spring is applied to hold the valve-disk against its seat.

By placing the valve-disk on the inside of the cylinder and applying either a bent wire spring, as E, Figs. 3 and 4, or a coil wire spring, as E, Fig. 5, to the rod C, the disk will be held against its seat around the aperture $a$, and will be opened by drawing out the rod at the front of the faucet; or, by placing the valve-disk behind the aperture $a$ and applying the spring behind the disk, as at E, Fig. 6, the rod requires to be pushed in to open the faucet.

When the coil-spring is made use of, as in Figs. 5 and 6, a guide, $g$, is provided for the end of the rod, and also for the support of the coil-spring. This guide is a stirrup-shaped piece fixed to the inner side of the faucet, and with a hole in the center for the rod C to work through. In applying the other style of spring one limb is fixed by being inserted in a sleeve, $w'$, secured either in a horizontal position under the flange W or in a vertical position upon the side of the valve-case A, as shown in Figs. 3 and 4, respectively, and connected at the other end with the end of the rod C by a hook on one and an eye on the other, as will be understood by reference to Figs. 3 and 4. The spring in each of these constructions is located entirely within the faucet and the can or receptacle to which the device is applied, and in making each application of the device a hole is cut into the can sufficiently large to let in this projecting part on the back of the faucet, and then the flange W, being set flat against the surface of the can around this opening, is fixed and sealed around the rim by solder.

In the operation of this faucet the liquid will flow from the spout as long as the disk is held away from the opening $a$, and when released the spring brings the disk back to its seat, and the flow is cut off. To hold the faucet open without the continued application of pressure or of pulling force to the rod C, a notch, $h$, is cut into one side of the rod at such point in the length of the rod that when the disk is drawn away clear of the opening $a$ this notch will rest in the aperture $b$ in the head of the faucet, and by a slight lateral movement of the rod will engage with the edge of the metal around the aperture. At this movement a disk, H, of leather, cork, or other suitable material, placed on the rod just back of the notch, is brought against the head and caused to cover and close the aperture $b$. This serves to prevent the escape of liquid at this point around the rod.

In connection with those parts and the construction shown in the drawings, I have provided for the application of a screw-cap to cover the head of the faucet during transportation and at other times when not in use; but as such devices are already known and used, and, excepting in the case of that construction shown in Fig. 6, where the rod operates by a pushing force applied against the end, the same is not generally necessary to the practical operation of my faucet, I have not given any particular description of this part.

As thus constructed and provided, my improved faucet is readily applied to oil cans and packages by simply cutting out a portion of the head or other surface at the part where the device is to be placed, and fixing the faucet by means of its flange in a permanent manner, as before described.

I am aware that faucets with spring-actuated valves have been known heretofore, and I do not lay claim to such, broadly, nor to any heretofore known, except they be provided with a sleeve, as $w'$, for the reception of one end of the spring, so that the said spring may be readily removed or replaced in case it becomes weakened or worn and a new one required. In case also of making the device, and when it is not desired to have the spring in place and exerting its force before the apparatus is in use, the spring may be left off until it is ready for use, and then set in place without tools, and without its requiring a skilled workman or any appreciable amount of time.

Having thus fully described my invention, what I claim, and desire to secure by Letters Patent, is—

In a faucet, the combination, with the body A, flange W, and sleeve $w'$, of the valve D, rod C, and spring E, having one end inserted in the sleeve, and the other connected with the lower end of the rod C, as set forth.

JOHN TILTON. [L. S.]

Witnesses:
EDWARD E. OSBORN,
JNO. L. TAGGARD.